United States Patent [19]

Ballu

[11] Patent Number: 4,947,986

[45] Date of Patent: Aug. 14, 1990

[54] APPARATUS FOR INTRODUCING A METERED QUANTITY OF PRODUCT INTO A VESSEL

[75] Inventor: Patrick J. M. Ballu, Reims, France

[73] Assignee: Tecnoma, France

[21] Appl. No.: 346,713

[22] Filed: May 3, 1989

[30] Foreign Application Priority Data

May 4, 1988 [FR] France .................. 88 05976

[51] Int. Cl.$^5$ .................. B65D 25/08; B67D 5/56
[52] U.S. Cl. .................. 206/221; 215/DIG. 8; 222/145; 222/545
[58] Field of Search .................. 222/80, 145, 529, 530, 222/545; 206/219, 221, 222; 215/DIG. 8, 6

[56] References Cited

U.S. PATENT DOCUMENTS

| | | | |
|---|---|---|---|
| 3,237,816 | 3/1966 | Anderson | 222/545 |
| 3,924,741 | 12/1975 | Kachur et al. | 206/221 |
| 4,024,952 | 5/1977 | Leitz | 206/221 |
| 4,132,308 | 1/1979 | Goncalves | 206/219 |
| 4,513,861 | 4/1985 | Baram | 206/219 |
| 4,591,050 | 5/1986 | Finke et al. | 206/222 |
| 4,615,437 | 10/1986 | Finke et al. | 206/222 |
| 4,773,529 | 9/1988 | Finke et al. | 206/222 |

FOREIGN PATENT DOCUMENTS

| | | | |
|---|---|---|---|
| 2200536 | 7/1973 | Fed. Rep. of Germany | 206/219 |
| 7736840 | 3/1978 | Fed. Rep. of Germany | . |
| 2305364 | 10/1976 | France | 206/221 |
| 2384685 | 11/1978 | France | 206/221 |
| 1436648 | 5/1976 | United Kingdom | 215/DIG. 8 |

*Primary Examiner*—Bryon Gehman
*Attorney, Agent, or Firm*—Watson, Cole, Grindle & Watson

[57] ABSTRACT

A container apparatus for introducing a metered quantity of a product into a vessel such as a mixing and diluting tank without includes a capsule which is in two parts joined together by screwing and which is integral with a clamping collar screwed onto a neck (2) of the vessel. A first one of the parts of the capsule rotates together with the clamping collar during the screwing, whereas the second part is immobilized in terms of rotation relative to the vessel, and the screw pitches are such that the screwing of the clamping collar onto the neck causes the separation of the two parts the capsule and opens slots in the second part so that the product contained in the capsule can flow therethrough.

10 Claims, 2 Drawing Sheets

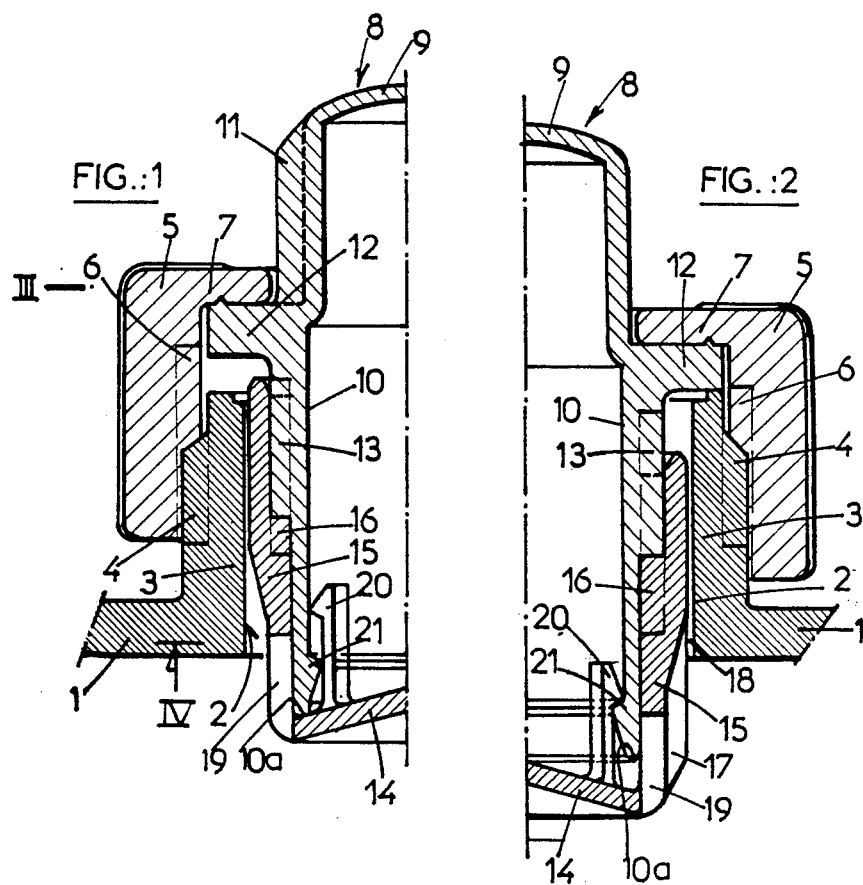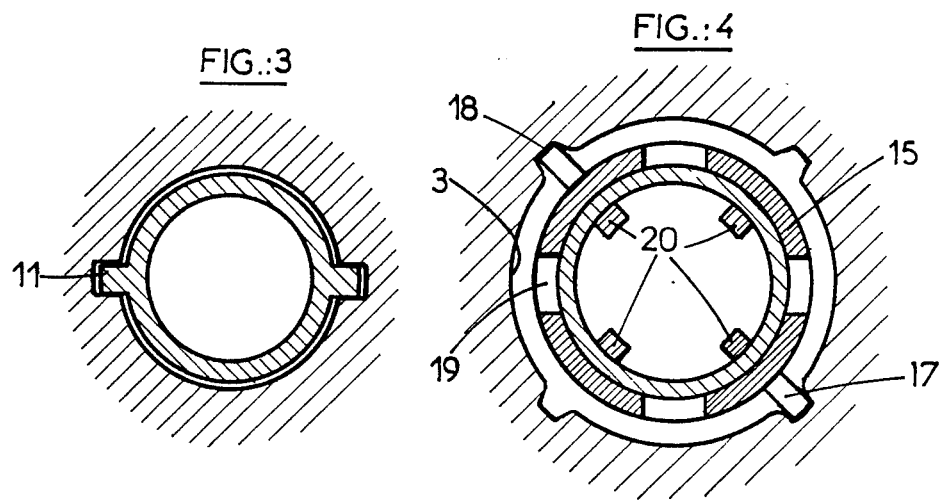

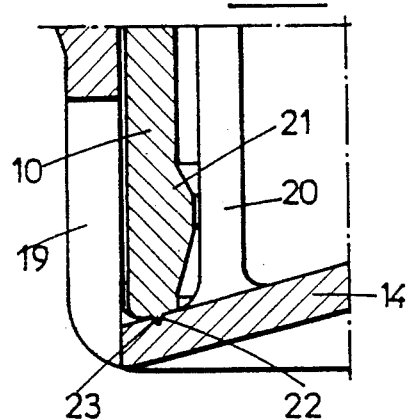
FIG.: 5
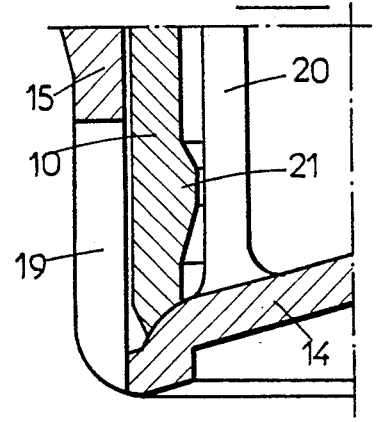
FIG.: 8
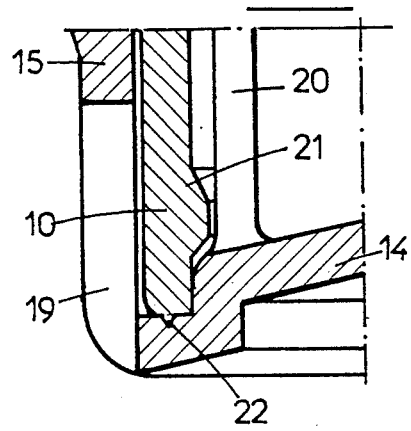
FIG.: 6
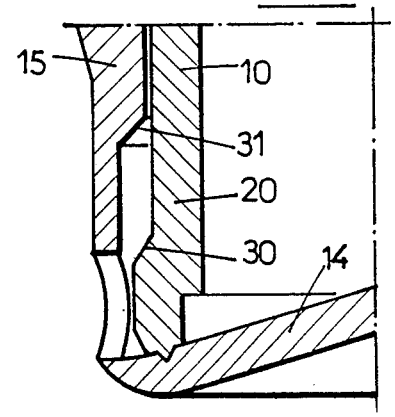
FIG.: 9
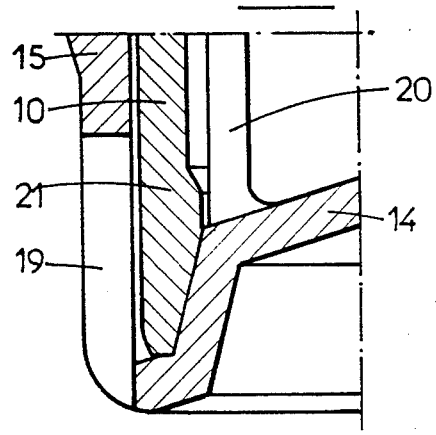
FIG.: 7
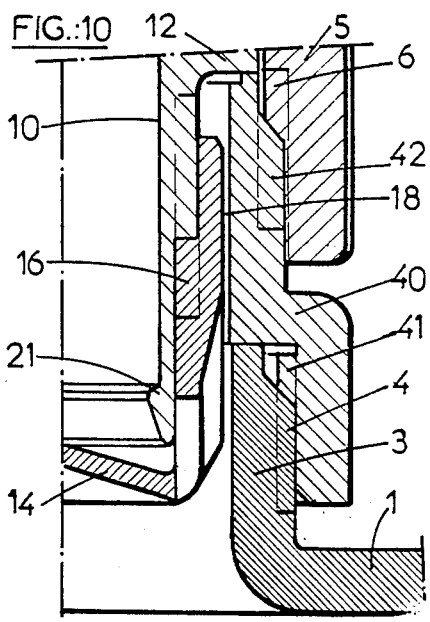
FIG.: 10

APPARATUS FOR INTRODUCING A METERED QUANTITY OF PRODUCT INTO A VESSEL

BACKGROUND OF THE INVENTION

The present invention relates to a device for introducing a metered quantity of a product into a vessel, without it being possible for the product to spill outside the vessel.

The current tendency in agriculture is to use treatment products which are supplied in concentrated form and diluted with water on the spot in a large-size tank, just before being spread over the ground or on the plants. The treatment products in the concentrated state can be dangerous for the operating personnel or to the environment. They therefore have to be contained in sealed vessels before use, and the empty vessel still containing small quantities of product has to be closed again after use in order to be treated in a special installation. This means that the vessel containing the concentrated product must be closed as long as it is not associated with the mixing tank and must open only towards the interior of this tank or into a vessel specially provided for cleaning it as appropriate.

However, it is expedient that the device be simple and of a relatively low cost and that there be the possibility of adapting it easily to existing tanks, with a minimum amount of conversion of these.

SUMMARY OF THE INVENTION

This result is obtained in the present invention using a device which comprises a capsule formed of two parts screwed to another, one of the parts having slots which pass through it and which are masked by the other part when the two parts are screwed home, in order to contain the treatment product sealingly in the capsule, these slots opening as a result of the unscrewing of the two parts so as to put the interior of the capsule in communication with the interior of the vessel. The capsule is integral with a plug capable of being screwed onto an orifice passing through the wall of the vessel. It is possible to drive one of the two parts of the capsule in rotation together with the cover during the screwing of the latter and to prevent the rotation of the other part of the capsule during this screwing. The direction of the pitches in the screwing of the two parts of the capsule to one another and of the cover onto the orifice of the vessel is calculated so that the screwing of the cover at the same time causes the masking of the orifice and the exposure of the slots.

Preferably, the plug consists of a collar, which can be fitted to the edge of the orifice by screwing, and of the capsule itself, a first part of which is integral with the collar in terms of rotation, whereas the second part of the inner wall of the orifice has means interacting to prevent the rotation of the second part.

Advantageously, the first part of the capsule can be separated from the collar and be clamped between the collar and the edge of the orifice when the plug is screwed.

According to an expedient practical embodiment, the first part of the capsule comprises a bottom and a cylindrical wall having an aperture directed towards the interior of the vessel when the device is in place, this cylindrical wall carrying externally a flange intended to be clamped between the edge of the orifice and the collar, projections or grooves for interaction with the collar, and an external thread, and the second part of the capsule comprises a bottom and a cylindrical wall having an aperture directed opposite to that of the first part, the edge of the cylindrical wall of the first part coming to bear sealingly on the bottom of the second part in the screwed position, and the cylindrical wall of the second part has an internal thread for interacting with the external thread of the first part, and projections or grooves for interacting with corresponding reliefs of the inner wall of the orifice, this cylindrical wall also possessing slots in the vicinity of the bottom.

According to this embodiment, it is the first part of the capsule with its flange clamped against the edge of the orifice, which alone ensures the masking of the latter.

To prevent an incorrect action causing the second part to fall into the vessel, there are advantageously means provided for preventing the two parts of the capsule from separating when they are divided. These means can comprise two hooks carried by one of the parts and interacting with one of the projections of the other part of the capsule.

According to a useful alternative version, if the inner wall of the orifice is smooth, the device possesses an adaptor which fastened to the vessel in order to extend the orifice and which carries the reliefs interacting with projections or grooves of the cylindrical wall of the second part for the purpose of preventing the rotation of the latter.

The invention will now be described in more detail by means of practical exemplary embodiments illustrated in the drawings.

BRIEF DESCRIPTION OF THE DRAWINGS

FIG. 1 is an axial half-section through the device, the capsule being closed,

FIG. 2 is an axial section through the same device, the capsule being open,

FIG. 3 is a cross-section along the line III—III of FIG. 1,

FIG. 4 is an axial section along the line IV—IV of FIG. 1,

FIGS. 5 to 9 are partial axial sections showing alternative versions of the sealing means of the capsule, FIG. 10 is a section similar to that of FIG. 2, but with an adaptor.

DETAILED DESCRIPTION OF THE PREFERRED EMBODIMENTS

FIGS. 1 and 2 relate to device according to the invention which is intended to be fitted in an orifice of a mixing vessel. The reference 1 denotes the wall of the vessel and 2 the orifice used. The orifice 2 can be a filling orifice or any other suitable orifice. If it is an emptying orifice located in the bottom of the vessel, the top and bottom of FIG. 2 will be reversed when the vessel is in use.

The orifice 2 is equipped with a neck 3 which has an external thread 4. A clamping collar 5 has an internal thread 6, designed to interact with the thread 4 of the vessel, and an external flange of narrower diameter 7. The capsule comprises a first part 8 composed of a bottom 9 and of a generally cylindrical part 10. This cylindrical part carries on its outer face, from top to bottom in FIGS. 1 and 2, ribs 11, a flange 12 intended for coming to rest between the flange 7 of the clamping collar and the outer edge of the neck 3, a thread 13 of a pitch opposite that of the threads 4 and 6 and a free end 10 *a*. The outer end of the cylindrical wall 10 is formed so as to serve as a sealing surface, as will be explained later.

The second part of the capsule comprises a bottom 14 and a cylindrical wall 15, into which the cylindrical wall 10 of the first part penetrates. The wall 15 has a thread 16 designed to interact with the thread 13 of the first part, and axial ribs 17 which can be seen better in FIG. 4 and which are intended for interacting with grooves 18 located on the inner wall of the neck 3. The wall 15 has passing through it slots 19 intended for the flow-off of the product contained inside the capsule.

If the neck 3 of the vessel is devoid of grooves 18 or of equivalent reliefs, this lack can be made good by mounting an adaptor provided with such grooves on the orifice 2. Such an adaptor 40 is shown in FIG. 10. It has a female thread 41 making it possible to screw it onto the thread 4 of the neck, and a male thread 42 onto which the internal thread 6 of the clamping collar will be screwed.

The method of use for the device is as follows:

The capsule filled with concentrated product and closed is supplied by the manufacturer. The user inserts it into the clamping collar 5, taking care to introduce the ribs 11 into corresponding grooves of the latter. He then installs the assembly as a whole by introducing the ribs 17 of the second part of the capsule into the grooves 18 of the neck of the vessel, and subsequently he clamps the clamping collar by screwing the thread 6 onto the thread 4.

The grooves 18 are greatly widened towards the outside of the neck, to make it easier to introduce the ribs 17.

The first part of the capsule, driven by the ribs 11, rotates together with the clamping collar, whereas the second part of the capsule, retained by the grooves 18 and the ribs 17, can move only in the axial direction (vertical in FIGS. 1 and 2). Because the threads 13 and 16 are of a pitch opposite that of the threads 4 and 6, the clamping of the collar 5 causes the relative slackening of the first and second parts of the capsule. As a result of this, the free end 10 *a* of the cylindrical part 10 of the first part moves away from the bottom 14 of the second part and the concentrated product contained in the capsule can then flow off freely through the slots 19.

It will be seen that this result can be obtained with threads which all have a right-handed or a left-handed pitch, provided that the pitch of the threads 13 and 16 is of a dimension different from that of the threads 4 and 6.

When the concentrated product has flowed off into the vessel, the capsule can be recovered by carrying out a reverse operation: the slackening of the collar 5 causes the mutual rescrewing of the first and second parts, with the result that, when the capsule is removed, it is reclosed and therefore the residues of concentrated product which it may contain cannot spill outside.

For a new operation, the spent capsule is replaced by a full capsule.

The reference 20 in FIGS. 1, 2 and 4 denotes safety hooks which are carried by the bottom 14 of the second part and which, in the unscrewing position, interact with the projection 21 located on the inner face of the first part of the capsule. In fact, it can happen that, if the collar 5 has been rotated without the threads 4 and 6 interacting, whilst the ribs 17 are already engaged in the grooves 18, an excessive unscrewing of the two parts of the capsule occur and the latter risks falling into the vessel before the collar 5 is completely clamped. This disadvantage is avoided by using the hooks 20. FIG. 4 shows four hooks 20. It is clear that this is not a limiting number. The hooks 20 are preferably located between the slots 19 so as not to impede the flow of the product.

FIGS. 5 to 8 are detailed diagrams showing how the sealing between the two parts of the capsule is obtained. In FIG. 5, sealing is obtained by means of a circular rib 22 provided on the end of the cylindrical part 10 of the first part and penetrating into an annular recess 23 made in the bottom 14 of the second part. Of course, it is possible to interchange the rib and the recess.

In FIGS. 6 to 8, sealing is obtained or completed as a result of the interaction of cylindrical surfaces which are thrustoconical or in the form of a portion of a torus.

In FIG. 9, the hooks 20 have been omitted, and the desired result is obtained as a result of the interaction of an outer projection 30 of the cylindrical part 10 of the first part and an inner projection 31 of the cylindrical part of the second part.

What is claimed is:

1. A container apparatus adapted for use with a vessel that includes a neck that defines an orifice which communicates with an interior of the vessel and which provides an external threaded engagement means, said container apparatus being capable of containing a metered quantity of liquid product and delivering the metered quantity of liquid product through the orifice and into the interior of the vessel without spilling, said container apparatus comprising:

a clamping collar having first threaded engagement means for threaded engagement with the external threaded engagement means of said neck so as to move said clamping means along said neck toward and away from said vessel, and a capsule device having an interior in which the metered quantity of liquid product is stored, said capsule device comprising first and second parts, said first part including a bottom and a generally cylindrical side wall which defines a sealing flange, a second threaded engagement means and a free end, said first part being connectable to said clamping collar so as to be rotatable therewith, and said second part including a bottom and a generally cylindrical side wall which extends around a portion of the side wall of said first part, said side wall of said second part defining an external locking means which can lock with said neck when inserted therein and a third threaded engagement means which engages with said second threaded engagement means, said side wall of said second part including drainage slots, said free end of said wall of said first part being in sealing contact with said bottom of said second part to prevent liquid flow through said drainage slots when liquid product is to be retained in the interior of said capsule device, said second part being located in said orifice when said clamping collar is engaged with said threaded engagement means of said neck of said vessel, said second and third threaded engagement means and said locking means (a) causing said first and second parts to separate when said clamping collar is rotated relative to said neck and towards said vessel, thereby moving the free end of said second part to open said drainage slots and allow said metered quantity of liquid product to flow from said capsule device into the interior of said vessel by gravity, said sealing flange contacting said neck to close said orifice therein, and (b) causing said first and second parts to move together when said clamping collar is rotated relative to said neck and away from said vessel.

2. A container apparatus as claimed in claim 1, wherein said first threaded engagement means has a first pitch, and wherein said second and third threaded engagement means have a second pitch opposite to said first pitch.

3. A container apparatus as claimed in claim 1, wherein said neck includes at least one internal elongated groove and wherein said external locking means comprise at least one elongated projection, each elongated projection fitting within a corresponding elongated groove.

4. A container apparatus as claimed in claim 1, including means for preventing complete disengagement of said first and second parts.

5. A container apparatus as claimed in claim 4, wherein said means for preventing complete disengagement comprises hooks connected one of said first and second parts and latch projections on another of said first and second parts.

6. The combination of a container apparatus and an adaptor for use with a vessel that includes a neck that defines an orifice which communicates with an interior of the vessel and which provides an external threaded engagement means, said container aparatus being capable of containing a metered quantity of liquid product and delivering the metered quantity of liquid product through the orifice and into the interior of the vessel without spilling, said adaptor being generally cylindrical in shape and comprising a first threaded engagement means of said neck and second threaded engagement means, and said container apparatus comprising:
   a clamping collar having third threaded engagement means for threaded engagement with the second threaded engagement means of said adaptor so as to move said clamping means along said adaptor toward and away from said vessel when said adaptor is attached to said neck, and
   a capsule device having an interior in which the metered quantity of liquid product is stored, said capsule device comprising first and second parts,
   said first part including a bottom and a generally cylindrical side wall which defines a sealing flange, a fourth threaded engagement means and a free end, said first part being connectable to said clamping collar so as to be rotatable therewith, and
   said second part including a bottom and a generally cylindrical side wall which extends around a portion of the side wall of said first part, said side wall of said second part defining an external locking means which can lock with said adaptor when inserted therein, and a fifth threaded engagement means which engages with said fourth threaded engagement means, side wall of said second part including drainage slots, said free end of said side wall of said first part being in sealing contact with said bottom of said second part to prevent liquid flow through said drainage slots when liquid product is to be retained in the interior of said capsule device,
   said first threaded engagement means of said adaptor being threadingly engageable with said threaded engagement means of said neck to sealingly attach said adaptor to said neck of said vessel and said second part being located in said adaptor when said third threaded engagement means of said clamping collar is engaged with said second threaded engagement means of said adaptor, said fourth and fifth threaded engagement means and said external locking means (a) causing said first and second parts to separate when said clamping collar is rotated relative to said adaptor and towards said vessel, thereby moving the free end of said side wall of said first part away from the bottom of said second part to open said drainage slots and allow said metered quantity of liquid product to flow from said capsule device into the interior of said vessel by gravity, said sealing flange contacting said adaptor to close said orifice, and (b) causing said first and second parts to move together when said clamping collar is rotated relative to said adaptor and away from said vessel.

7. A combination as claimed in claim 6, wherein said second and third threaded engagement means have an opposite pitch to that of said fourth and fifth threaded engagement means.

8. A combination as claimed in claim 6, wherein said adaptor includes at least one internal elongated groove and wherein said external locking means comprise at least one elongated projection, each elongated projection filling within a corresponding elongated groove.

9. A combination as claimed in claim 6, including means for preventing complete disengagement of said first and second parts.

10. A container apparatus as claimed in claim 9, wherein said means for preventing complete disengagement comprises hooks connected with one of said first and second parts and latch projections on another of said first and second parts.

* * * * *